(12) United States Patent
Archer

(10) Patent No.: US 6,229,087 B1
(45) Date of Patent: May 8, 2001

(54) GANGABLE ELECTRICAL BOX

(75) Inventor: John Charles Archer, Cordova, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/375,874

(22) Filed: Aug. 17, 1999

(51) Int. Cl.$^7$ .................................................. H01J 5/00
(52) U.S. Cl. .............................. 174/50; 174/58; 220/4.02; 248/906
(58) Field of Search .......................... 174/48, 50, 17 R, 174/135, 58, 63; 220/3.2, 4.02, 3.8, 4.03, 3.3, 3.92, 3.94; 248/906; 439/535

(56) References Cited

U.S. PATENT DOCUMENTS

| | | |
|---|---|---|
| 926,246 * | 6/1909 | Dorff .................................... 220/3.94 |
| 933,661 | 9/1909 | Paiste . |
| 948,438 | 2/1910 | Ziegler et al. . |
| 1,066,215 | 7/1913 | Murray . |
| 1,104,930 | 7/1914 | Raquette . |
| 1,112,426 | 9/1914 | Stoddard . |
| 1,133,949 | 3/1915 | Evans . |
| 1,167,879 | 1/1916 | Bayleiss et al. . |
| 1,201,003 | 10/1916 | Van Duzer . |
| 1,205,589 * | 11/1916 | Young .................................. 220/3.92 |
| 1,208,393 * | 12/1916 | Smart .............................. 220/3.92 X |
| 1,230,218 | 6/1917 | Raquette . |
| 1,249,313 | 12/1917 | Boyton et al. . |
| 1,456,385 | 5/1923 | Kvarnstrom . |
| 1,483,453 | 5/1924 | Knoderer . |
| 1,531,309 * | 3/1925 | Ryden .................................. 220/3.94 |
| 1,534,723 | 4/1925 | Lewis . |
| 1,817,307 | 8/1931 | Haase et al. . |
| 1,857,787 | 5/1932 | Meeks et al. . |
| 2,552,400 | 5/1951 | Brunia ........................................ 220/4 |
| 2,959,633 | 11/1960 | Palmer et al. .......................... 174/50 |
| 3,564,112 * | 2/1971 | Algotsson ........................ 220/3.92 X |
| 3,622,029 | 11/1971 | Ware ...................................... 220/3.7 |
| 4,057,164 | 11/1977 | Maier ..................................... 220/3.6 |
| 4,111,328 | 9/1978 | Eggert et al. ............................ 220/4 |
| 4,263,472 | 4/1981 | Mahen ................................... 174/51 |
| 4,428,492 | 1/1984 | Jorgensen ........................... 220/3.94 |
| 5,159,155 * | 10/1992 | Nishihara ............................... 174/50 |
| 5,239,129 * | 8/1993 | Ehrenfels ......................... 220/3.3 X |
| 5,378,854 | 1/1995 | Hoover .................................. 174/53 |
| 5,574,255 | 11/1996 | Simmons ............................... 174/53 |
| 5,594,207 * | 1/1997 | Fabian et al. ......................... 174/58 |
| 6,066,802 * | 5/2000 | Reinke et al. ......................... 174/50 |
| 6,066,803 * | 5/2000 | Hagerty ................................. 174/50 |
| 6,107,567 * | 8/2000 | Blalock ................................. 174/58 |

FOREIGN PATENT DOCUMENTS

| | | | |
|---|---|---|---|
| 2033990 | 1/1972 | (DE) . | |
| 1086373 * | 11/1967 | (GB) .................................... 174/50 |
| 1444842 * | 8/1976 | (GB) .................................... 174/48 |

* cited by examiner

*Primary Examiner*—Dean A. Reichard
*Assistant Examiner*—Dhiru R Patel
(74) *Attorney, Agent, or Firm*—G. Andrew Barger

(57) ABSTRACT

A gangable electrical box adaptable for securing to at least one adjacent electrical box having an adjacent male coupling member and an adjacent female coupling member. The electrical box includes a side wall and a rear panel coupled to the side wall that defines an interior of the electrical box therewith. A male coupling member is disposed on the side wall and a female coupling member is disposed on the side wall opposite the male coupling member and in the interior of the electrical box. The female and male coupling members are securingly engagable to the adjacent male coupling member and the adjacent female coupling member, respectively, of the adjacent electrical box for permitting lateral coupling of two or more electrical boxes.

19 Claims, 8 Drawing Sheets

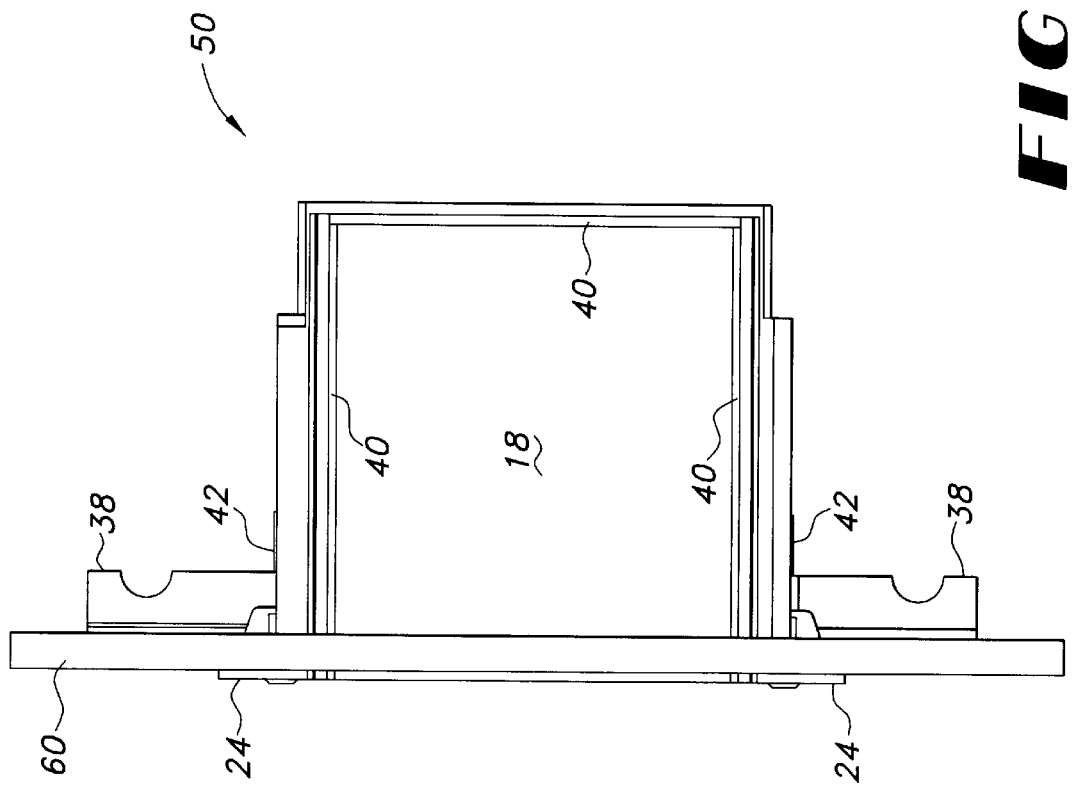

GANGABLE ELECTRICAL BOX

FIELD OF THE INVENTION

The present invention relates generally to electrical boxes for installing switches, plugs and accessories flush with a wall surface, and more particularly to a means for laterally ganging such electrical boxes using the same part.

BACKGROUND

It is common to make electrical boxes in various sizes to accommodate varying numbers and sizes of electrical components, such as electrical outlets, switches, etc. This multiplicity of sizes creates manufacturing and inventory problems for the fabricator, distributors, retailers and buildings.

There are two manners of construction concerned with electrical wall boxes. One is the "existing work" version in which a new electrical box is installed in existing construction, and the other manner is the "new work" construction in which a suitably sized electrical box is added to a structure in the process of being built. When an existing electrical box in existing construction must be expanded to hold, for example, two electrical switches, typically one must remove a large portion of the wall surrounding the existing electrical box. This greatly disfigures the area around the electrical box. After removing the existing electrical box, a differently-shaped, larger sized box is installed and wired after which the wall is refinished and repainted. This is a very labor-intensive and time-consuming task.

In "new work" construction where an electrical box is installed in a structure being built, an electrical box is typically connected to a support stud of the structure by means of a nail or screw attachment that is incorporated in the electrical box design. Drywall having holes cut for access to the electrical box is then installed to the support studs. Typically, in new construction, contractors must have on hand a multitude of differently sized electrical boxes to be able to select the required size as needed. Likewise, fabricators, distributors and retailers must be able to supply all of the sizes which may be required in any particular construction project.

Accordingly, it is desirable to have a single electrical box configuration that is easily gangable with an identical electrical box, hermaphroditic, and efficiently expandable in both existing and new work construction.

SUMMARY OF THE INVENTION

The present invention eliminates the above difficulties and disadvantages by providing an electrical box for receiving a first set of wires therein and adaptable for securing to an adjacent electrical box for receiving a second set of wires therein.

The electrical box includes a bounding side wall having at least one removable portion for permitting lateral access to the interior of the electrical box from the adjacent electrical box and a frangible notch formed in the at least one removable portion of the bounding side wall. A rear panel is coupled to the side wall of the electrical box and defines an interior of the electrical box therewith.

The electrical box further includes at least one male coupling member integrally formed on the side wall and that is substantially dovetail in shape. In addition, the electrical box includes at least one female coupling member integrally formed on the side wall opposite the at least one male coupling member and in the interior of the electrical box, the female coupling member being substantially dovetail in shape.

The female and male coupling members are slidingly engagable to the adjacent male coupling member and the adjacent female coupling member, respectively, of the adjacent electrical box, the electrical box is constructed of a hermaphroditic configuration for permitting lateral coupling of two or more electrical boxes.

When the electrical box is secured to the adjacent electrical box, the removable portion left intact serves to physically and electrically separate the first set of wires of the electrical box from the second set of wires of the adjacent electrical box. A device aperture is coupled to the side wall and disposed in the interior of the electrical box for securing a device such as a switch or electrical outlet to the electrical box.

BRIEF DESCRIPTION OF THE DRAWINGS

FIG. 8 is a side elevational view of the first electrical box of the present invention ganged to the second electrical box, which is identical, and secured to drywall.

DETAILED DESCRIPTION OF THE PREFERRED EMBODIMENT(S)

Figure 1:
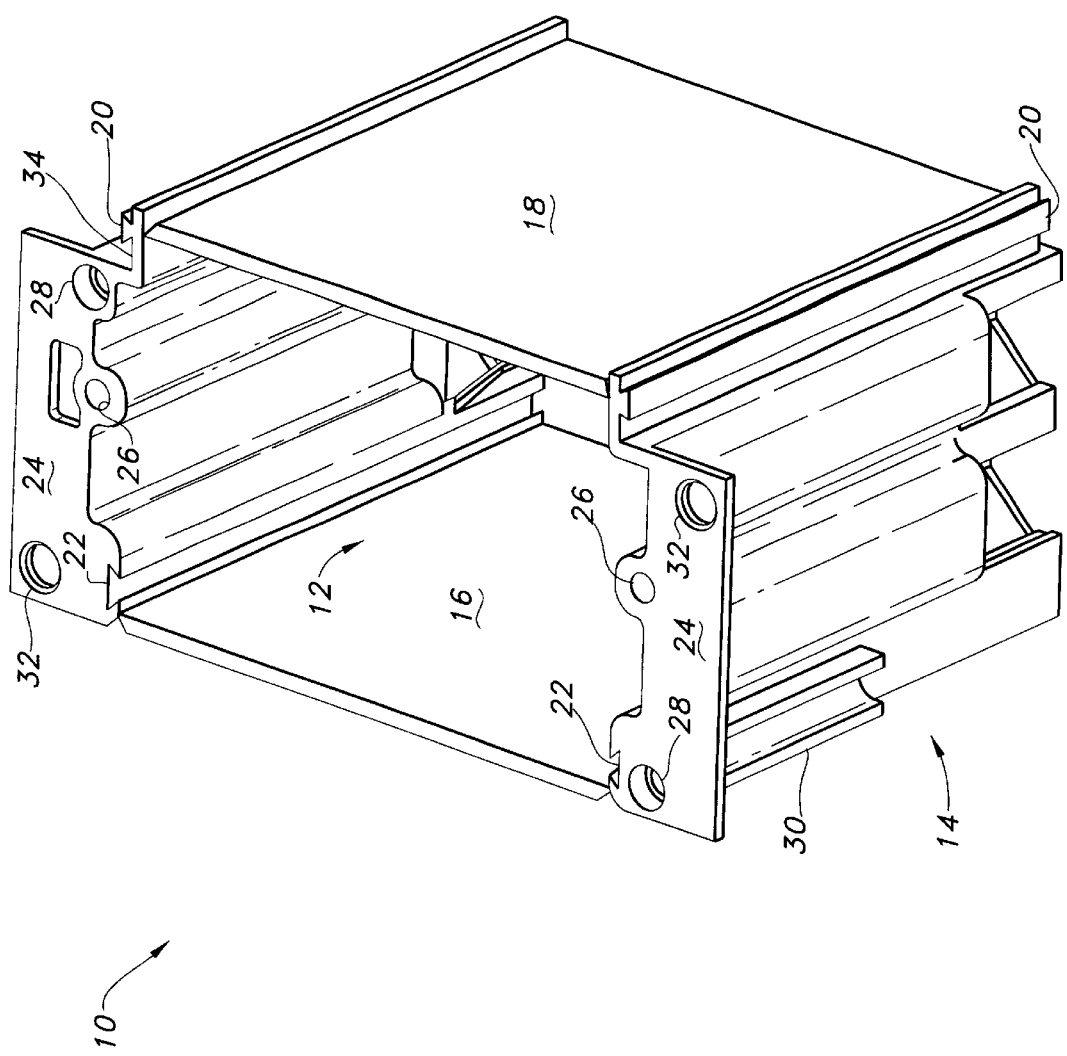
FIG. 1 is a front perspective view of an electrical box of the present invention.

The above and other features, aspects, and advantages of the present invention will now be discussed in the following detailed description and appended claims, which are to be considered in conjunction with the accompanying drawings in which identical reference characters designate like elements throughout the views.

Shown in FIG. 1 is an electrical box 10 for receiving a first set of wires therein and that is adaptable for securing to an adjacent electrical box 50, as shown in FIGS. 5–8, and that will be discussed in greater detail below. The electrical box 10 and adjacent electrical box 50 are preferably constructed of nylon, but could be constructed of any thermoplastic that is relatively hard and durable. The construction could also be of rust inhibited metal such as galvanized metal.

Figure 2:
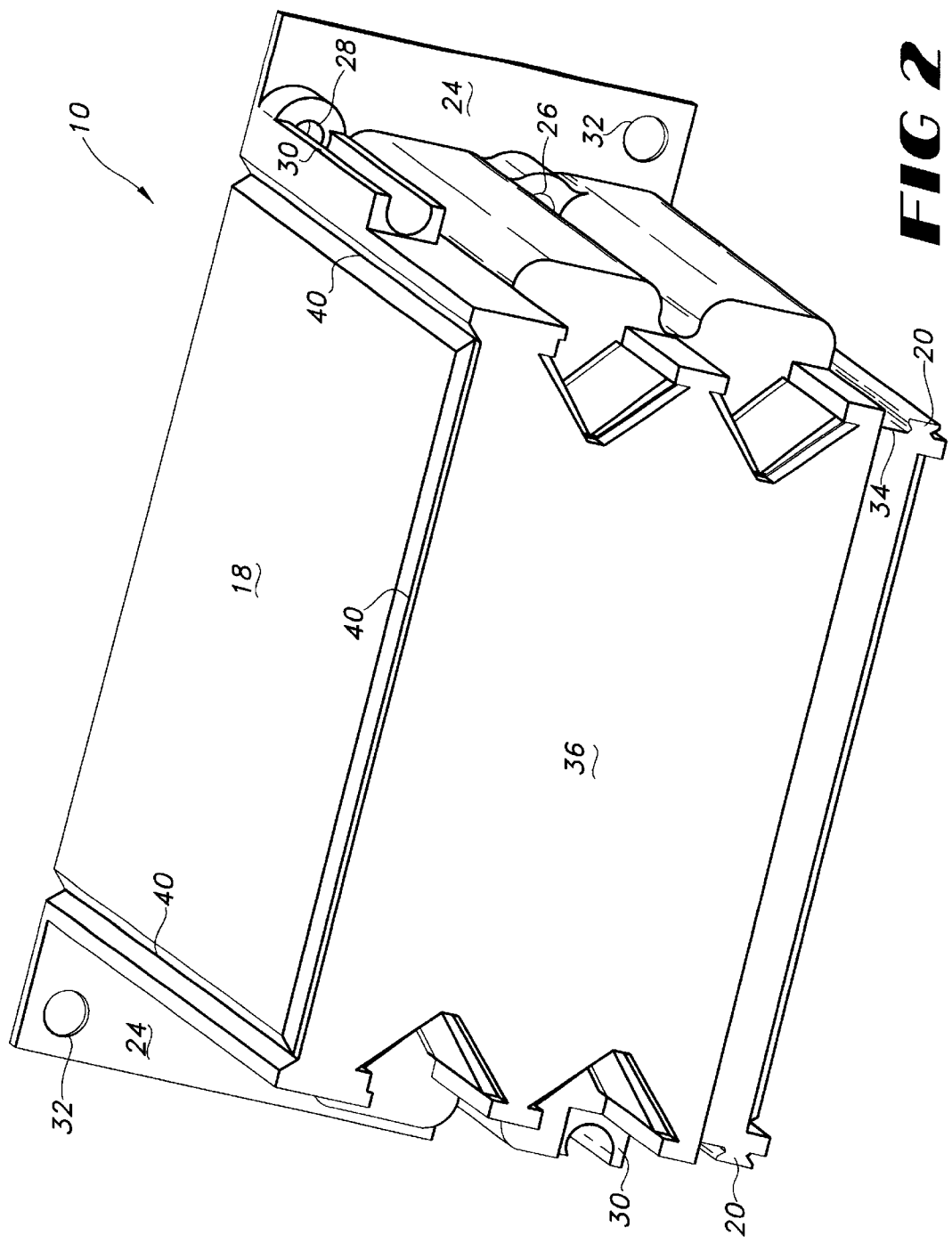
FIG. 2 is a rear perspective view of the electrical box of the present invention.
Figure 3:
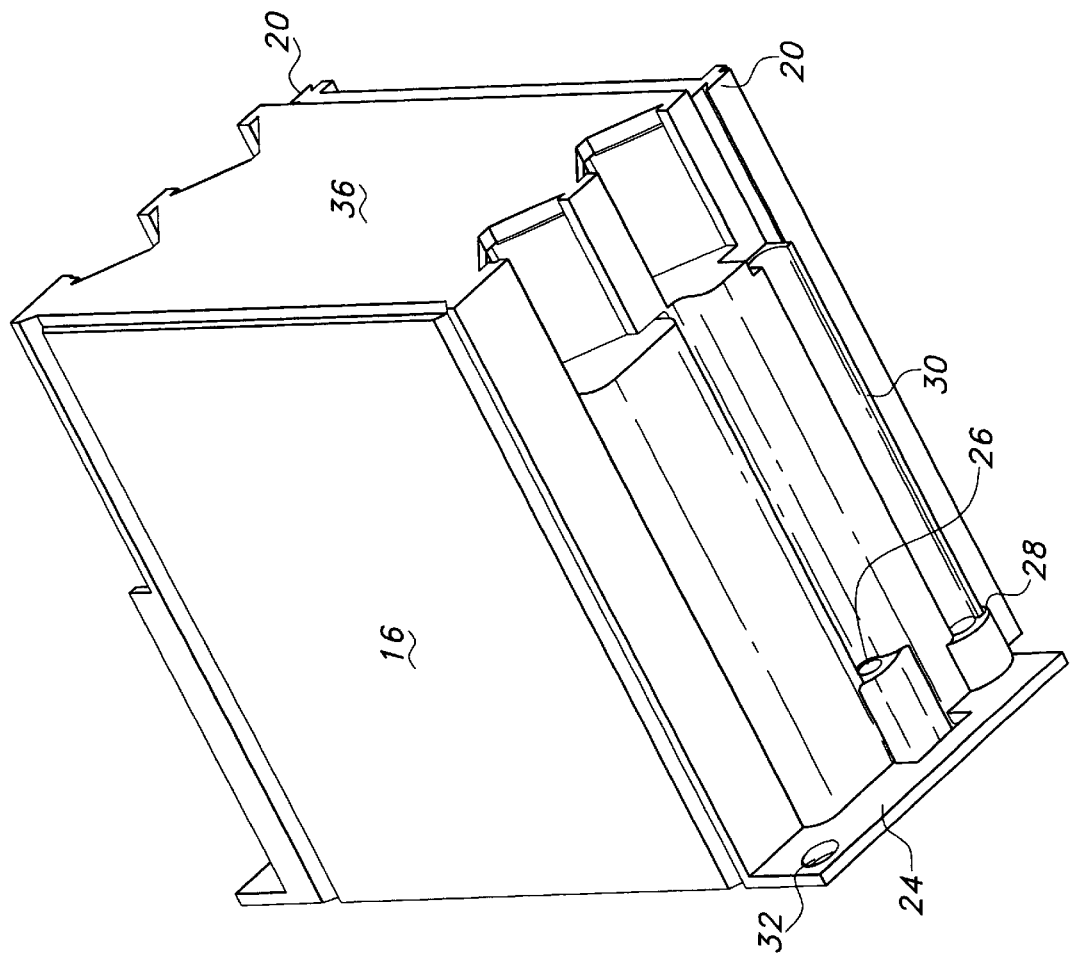
FIG. 3 is another rear perspective view of the electrical box of the present invention.
Figure 4:
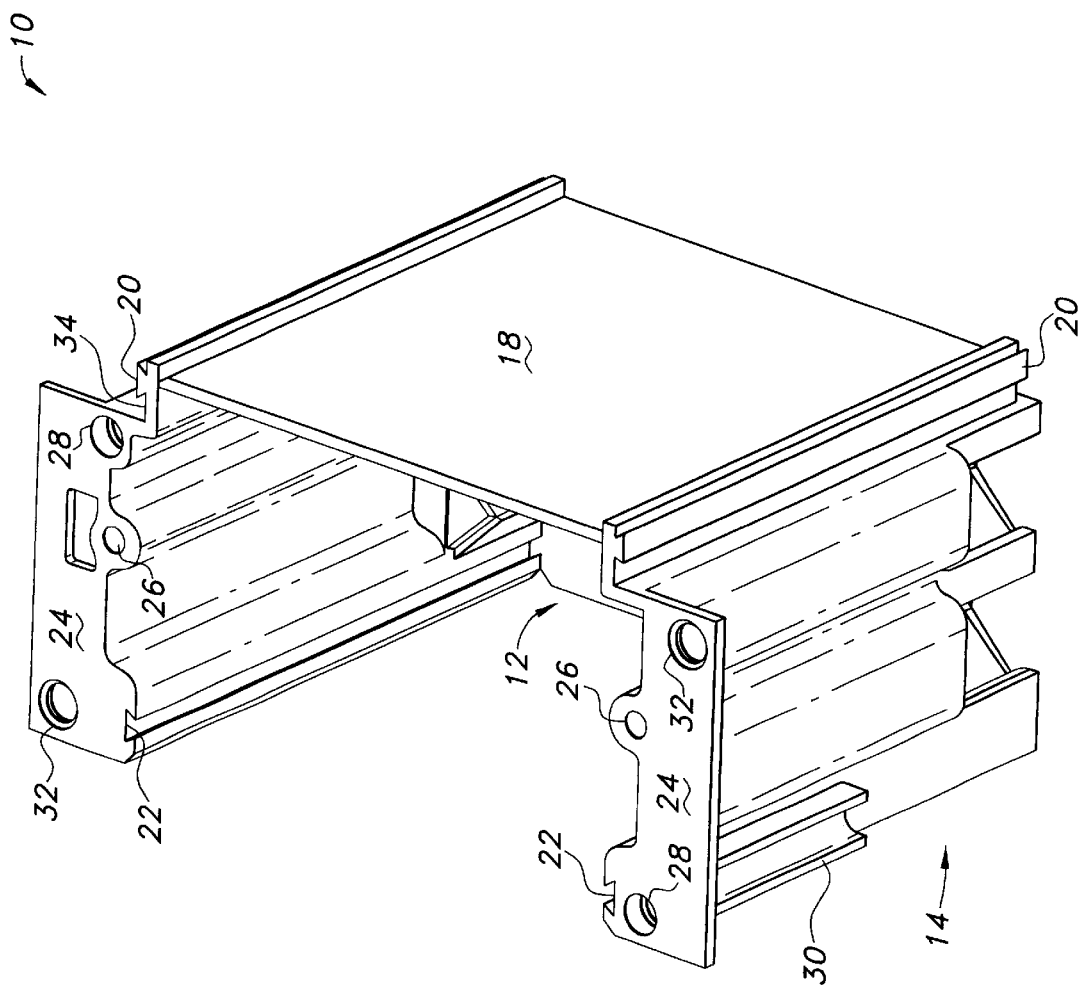
FIG. 4 a front perspective view of the electrical box of the present invention with a first removable portion removed.
Figure 5:
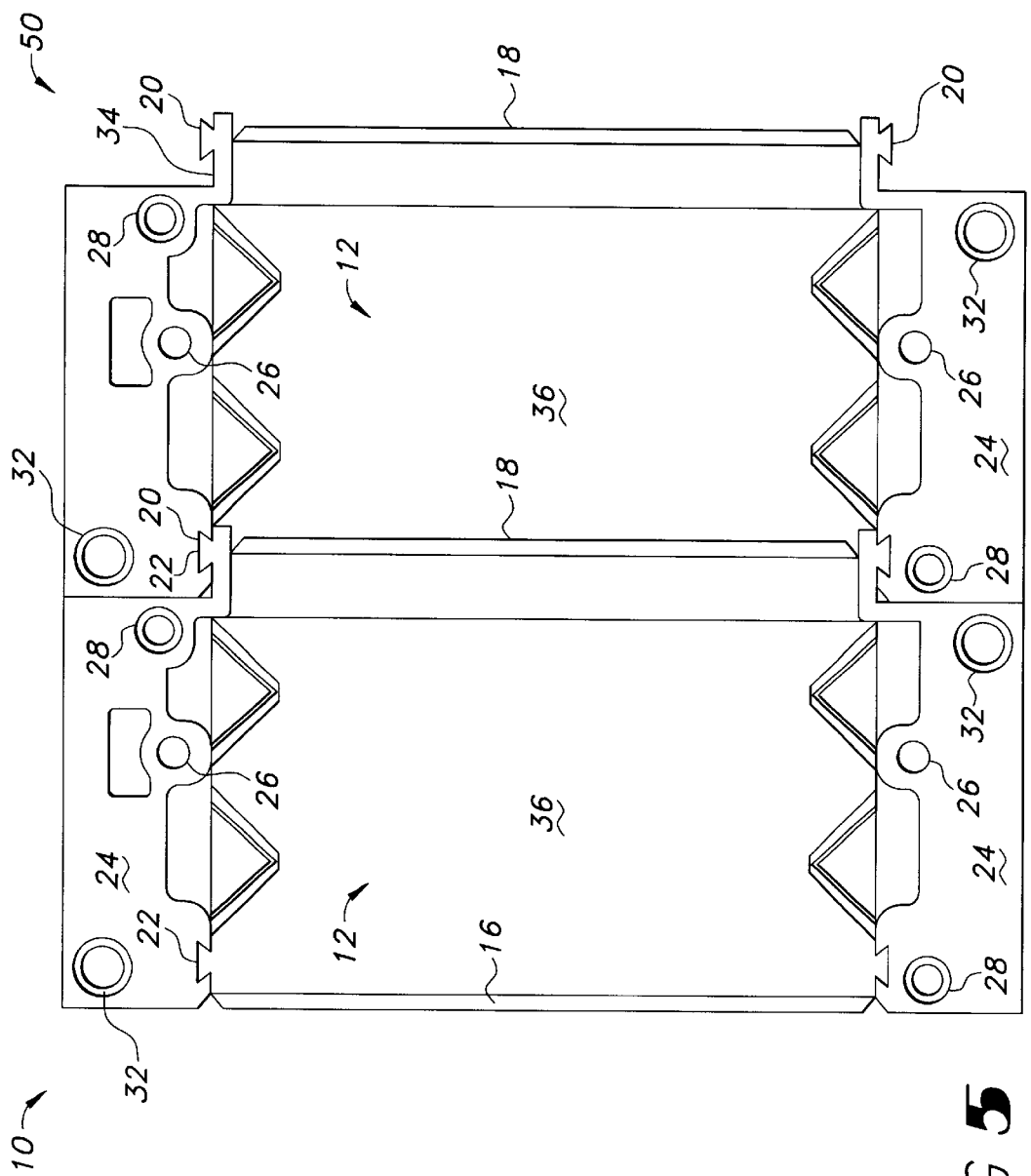
FIG. 5 is front plan view of a first electrical box of the present invention ganged to a second electrical box, which is identical.
Figure 7:
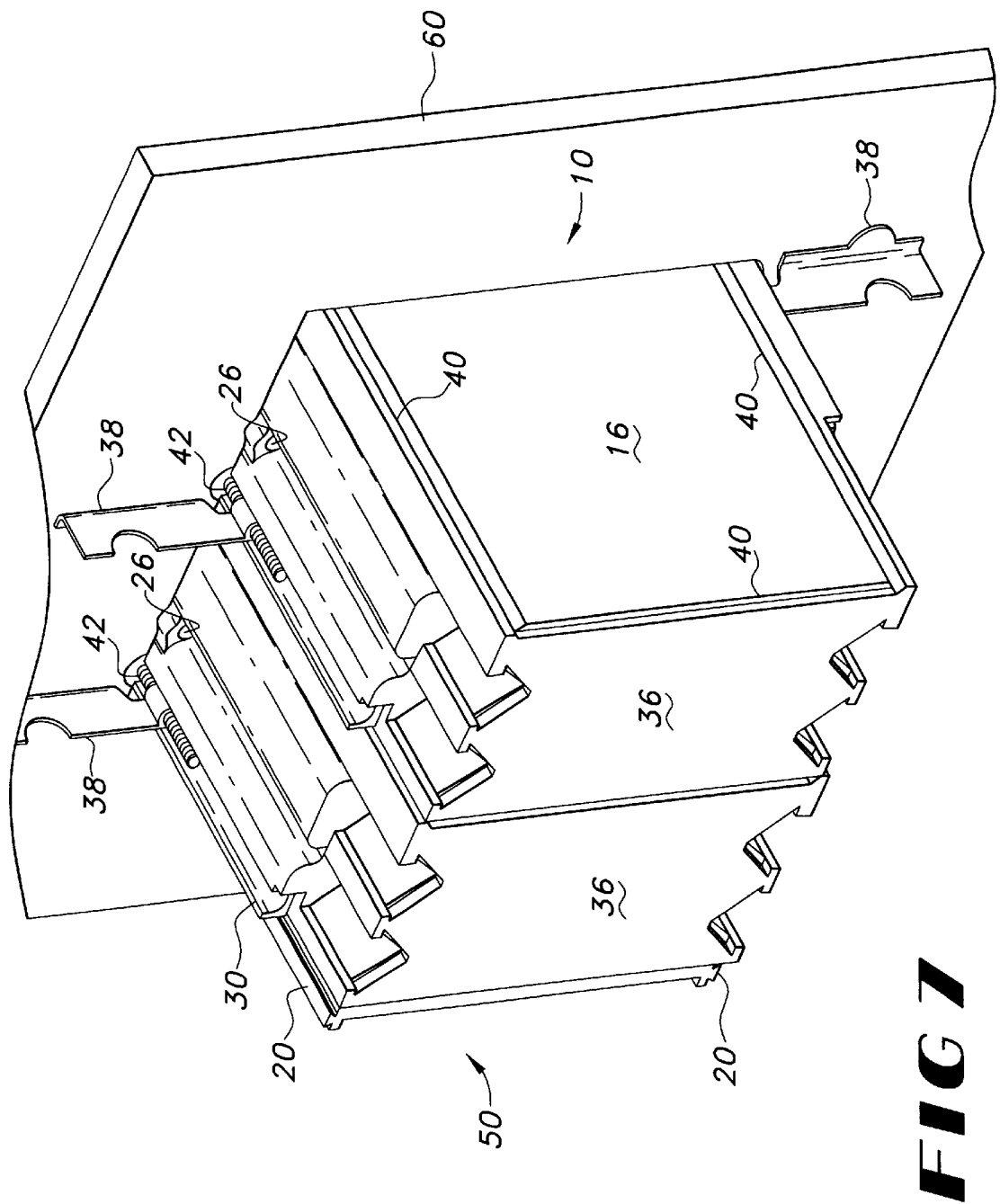
FIG. 7 is a rear perspective view of the first electrical box of the present invention ganged to the second electrical box, which is identical, and secured to drywall.

The electrical box 10 includes a bounding side wall 14 that has at least one removable portion or "knock out," as shown in FIG. 4, for permitting lateral access to the interior 12 of the electrical box 10 from the adjacent electrical box 50 once coupled thereto and allowing access to internal coupling members as will be discussed below. As is best shown in FIGS. 2, 7, and 8, a frangible notch 40 is formed in the at least one removable portion of the bounding side wall 14. Preferably, however, the bounding side wall 14 has a first removable portion 16 and a second removable portion 18. The first removable portion 16 and second removable portion 18 are preferably integrally formed with the bounding side wall 14 and formed from the material of which the side wall 14 is constructed. The notch 40 is ideally created by scoring the peripheral surface of the first removable portion 16 and the second removable portion 18, which are easily removed by an installer's hands or a pair of pliers used to apply torsional forces to the removable portions. A rear panel 36 is coupled to the side wall 14 of the electrical box 10, and is preferably integrally formed therewith, and defines an interior 12 of the electrical box 10 therewith, as shown in FIG. 5.

As is best shown in FIG. 1, the electrical box 10 further includes at least one male coupling member 20 integrally formed with the side wall 14 and that is substantially dovetail in shape. In addition, the electrical box 10 includes at least one female coupling member 22 integrally formed on the side wall 14 opposite the at least one male coupling member 20 and disposed in the interior 12 of the electrical box 10, the at least one female coupling member 22 is substantially dovetail in shape.

Figure 6:
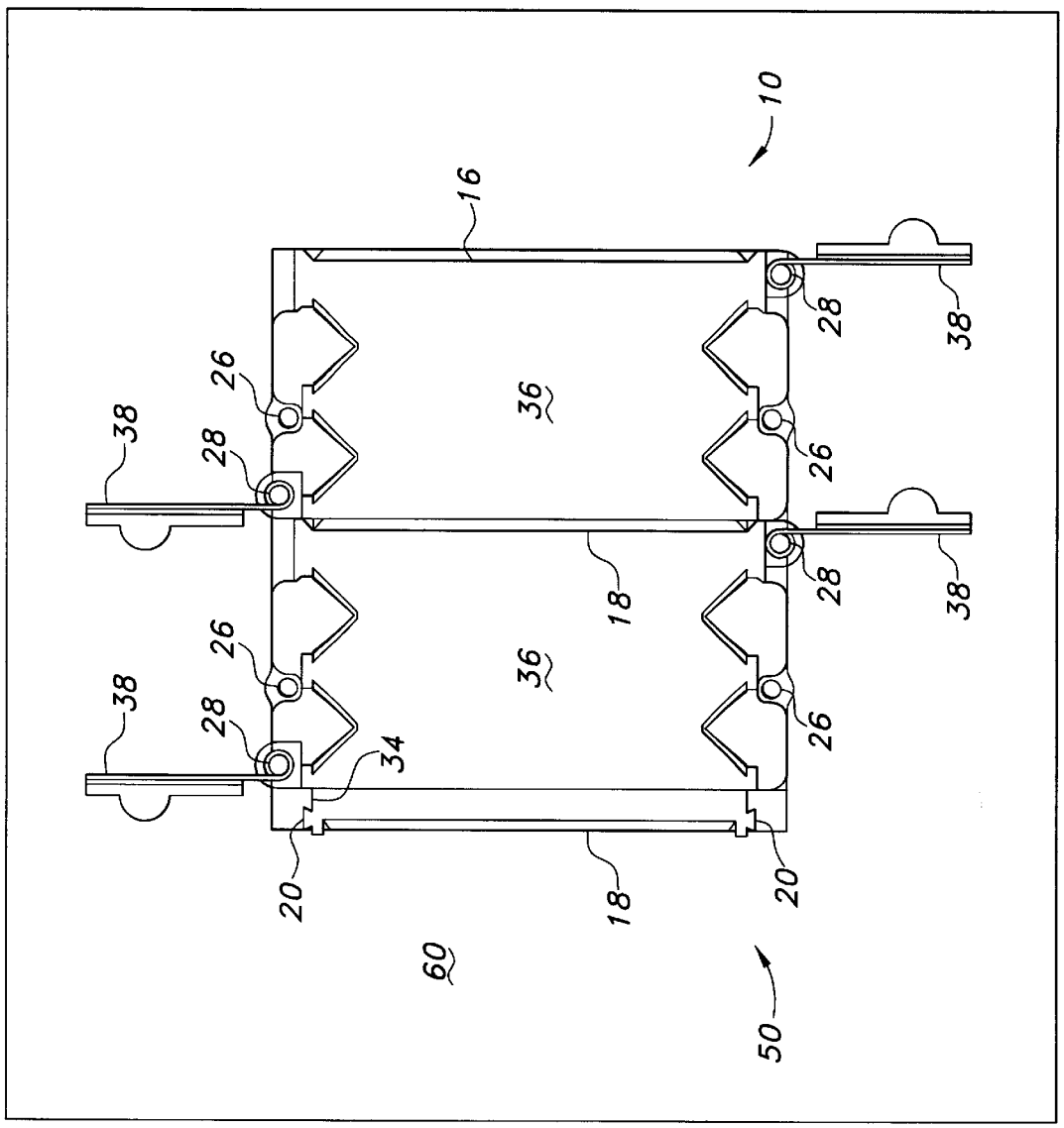
FIG. 6 is a rear plan view of the first electrical box of the present invention ganged to the second electrical box, which is identical, and secured to drywall.

The female coupling member 22 and male coupling member 20 are slidingly engagable to the adjacent male coupling member 20 and the adjacent female coupling member 22, respectively, of the adjacent electrical box 50. The adjacent electrical box 50 receives a second set of wires therein and has an adjacent male coupling member 20 and an adjacent female coupling member 22. Preferably, the adjacent electrical box 50 is identical to the electrical box 10 to which it is laterally coupled, as shown in FIGS. 5 and 6 for ganging and so that an installer need only carry one type of electrical box part.

It is understood, however, that the adjacent electrical box 50 could also be of a different configuration and construction as long as the adjacent male coupling member and the adjacent female coupling member 22 are complimentary to the female coupling member 22 and male coupling member 20, respectively, of the electrical box 10 to which it couples.

Preferably, the electrical box 10 is constructed of a hermaphroditic configuration for permitting lateral coupling of two or more identical electrical boxes. In this configuration, an extension 34 protrudes from two opposing side walls of the electrical box 10 with each of the extensions 34 having a male coupling member 20 integrally formed thereon, which is also best shown in FIG. 1. Preferably, the male coupling members 20 extend the longitudinal length of the electrical box 10 as do the female coupling members 22 so that when the electrical box 10 is coupled to the adjacent electrical box 50 the boxes align flush within the wall such that the rear panels 36 are substantially parallel. Moreover, when this coupling occurs the male coupling members 20 of the electrical box 10 slidingly engage the female coupling members 22 of the adjacent electrical box 50.

Formed between the extensions 34 is the second removable portion 18, which typically remains intact when coupled to the adjacent electrical box 50 as shown in FIG. 5. This provides for a physical and electrical separation of wires consisting of different voltages when the electrical box 10 is coupled to the adjacent electrical box 50. For example, the electrical box 10 could have low voltage data wires installed therein and the adjacent electrical box 50 have high voltage power wires installed in it. As is best shown in FIG. 4, it is the first removable portion 16 of the adjacent electrical box 50 that is removed such that the female coupling members 22 are accessible to the male coupling members 20 of the electrical box 10 and can receive such therein.

Formed with two opposing side walls of the electrical box 10 is a rectangular shaped flange 24, as best shown in FIG. 5, which is also constructed of the same material as the side walls 14. Disposed in each flange 24 is a device aperture 26 that is also disposed in the interior 12 of the electrical box 10 for securing a device such as a switch or electrical outlet to the electrical box 10. To meet industry code, the present electrical box 10 when coupled to the adjacent electrical box 50 will have the device apertures 26 equal distance apart from the first removable portion 16 and the second removable portion 18, respectively.

A coupling aperture 32 is also disposed in each flange 24, as is also best shown in FIG. 5, for receiving a nail or screw therein to aid in securing the electrical box 10 to a wall, such as drywall 60 shown in FIG. 7. As can be seen from FIGS. 7 and 8, once the electrical box 10 and adjacent electrical box 50 are installed in the drywall 60, each flange 24 is secured to the outside of the wall. Further disposed in each flange 24 is a bracket aperture 28 with a channeling guide 30 coupled thereto, as shown in FIG. 2, for receiving an attachment device such as a screw 42 therein. The channeling guide 30 extends partially the lateral length of the electrical box 10 for guiding the screw 42 behind the drywall 60 once inserted into a flange 24.

As shown in FIGS. 7 and 8, a bracket 38 is releasably secured to each screw 42 for further securing the electrical box 10 to the drywall 60. The bracket 38 is preferably constructed of a non-corrosive metal and installed over the non-head portion of the screw 42 and extends through the channel.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. An electrical box for receiving a first set of wires therein and adaptable for securing to an adjacent electrical box for receiving a second set of wires therein and having an adjacent male coupling member and an adjacent female coupling member, comprising:

a bounding side wall;

a rear panel coupled to the side wall and defining an interior of the electrical box therewith;

at least one male coupling member disposed on the side wall;

at least one female coupling member disposed on the side wall opposite the at least one male coupling member and in the interior of the electrical box; and wherein the at least one female and male coupling members are securingly engagable to the adjacent male coupling member and the adjacent female coupling member, respectively, of the adjacent electrical box for permitting lateral coupling of two or more electrical boxes.

2. The electrical box of claim 1 wherein the electrical box is constructed of a hermaphroditic configuration.

3. The electrical box of claim 1 wherein the male and female coupling members are formed integral with the side wall.

4. The electrical box of claim 1 wherein the at least one female and male coupling members permit sliding engagement with the adjacent female and the adjacent male coupling members, respectively, of the adjacent electrical box.

5. The electrical boxed of claim 1 wherein the side wall includes at least one removable portion for permitting lateral access to the interior of the electrical box from the adjacent electrical box.

6. The electrical box of claim 5 wherein the at least one removable portion comprises a frangible notch formed in the side wall.

7. The electrical box of claim 5 wherein when the electrical box is secured to the adjacent electrical box, the at least one removable portion left intact serves to physically and electrically separate the first set of wires of the electrical box from the second set of wires of the adjacent electrical box.

8. The electrical box of claim 1 wherein the at least one female and male coupling members are substantially dovetail in shape.

9. The electrical box of claim 1 further comprising at least one device aperture coupled to the side wall and disposed in the interior of the electrical box.

10. An electrical box for receiving a first set of wires therein and adaptable for securing to an adjacent electrical box for receiving a second set of wires therein and having an adjacent male coupling member and an adjacent female coupling member, comprising:

a bounding side wall including at least one removable portion for permitting lateral access to the interior of the electrical box from the adjacent electrical box;

a rear panel coupled to the side wall and defining an interior of the electrical box therewith;

at least one male coupling member disposed on the side wall;

at least one female coupling member disposed on the side wall opposite the at least one male coupling member and in the interior of the electrical box; and wherein the at least one female and male coupling members are securingly engagable to the adjacent male coupling member and the adjacent female coupling member, respectively, of the adjacent electrical box, the electrical box is constructed of a hermaphroditic configuration for permitting lateral coupling of two or more electrical boxes.

11. The electrical box of claim 10 wherein the male and female coupling members are formed integral with the side wall.

12. The electrical box of claim 10 wherein the at least one female and male coupling members permit sliding engagement with the adjacent female and the adjacent male coupling members, respectively, of the adjacent electrical box.

13. The electrical box of claim 10 wherein the at least one removable portion comprises a frangible notch formed in the side wall.

14. The electrical box of claim 10 wherein when the electrical box is secured to the adjacent electrical box, the at least one removable portion left intact serves to physically and electrically separate the first set of wires of the electrical box from the second set of wires of the adjacent electrical box.

15. The electrical box of claim 10 wherein the at least one female and male coupling members are substantially dovetail in shape.

16. The electrical box of claim 10 further comprising at least one device aperture coupled to the side wall and disposed in the interior of the electrical box.

17. An electrical box for receiving a first set of wires therein and adaptable for securing to an adjacent electrical box for receiving a second set of wires therein and having an adjacent male coupling member and an adjacent female coupling member, comprising:

a bounding side wall including at least one removable portion for permitting lateral access to the interior of the electrical box from the adjacent electrical box;

a frangible notch formed in the at least one removable portion of the bounding side wall;

a rear panel coupled to the side wall and defining an interior of the electrical box therewith;

at least one male coupling member integrally formed on the side wall and being substantially dovetail in shape;

at least one female coupling member integrally formed on the side wall opposite the at least one male coupling member and in the interior of the electrical box, the at least one female coupling member being substantially dovetail in shape; and wherein the at least one female and male coupling members are slidingly engagable to the adjacent male coupling member and the adjacent female coupling member, respectively, of the adjacent electrical box, the electrical box is constructed of a hermaphroditic configuration for permitting lateral coupling of two or more electrical boxes.

18. The electrical box of claim 17 wherein when the electrical box is secured to the adjacent electrical box, the at least one removable portion left intact serves to physically and electrically separate the first set of wires of the electrical box from the second set of wires of the adjacent electrical box.

19. The electrical box of claim 17 further comprising at least one device aperture coupled to the side wall and disposed in the interior of the electrical box.

* * * * *